May 23, 1967  W. E. P. JEFFERY ETAL  3,320,986
CHISELS
Filed April 9, 1965
Fig. 1.
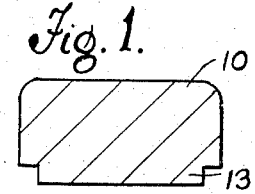
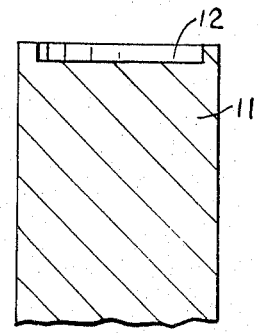
Fig. 2.
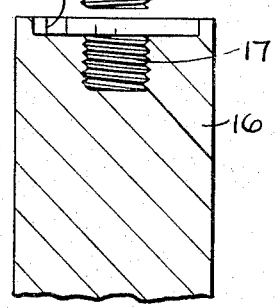
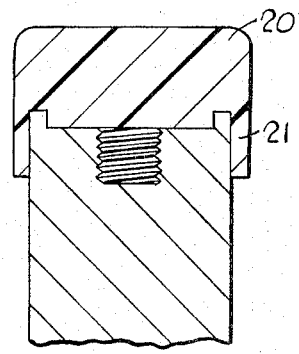
Fig. 3.
Fig. 4.
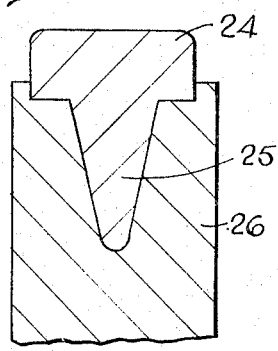
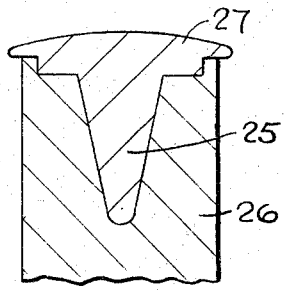
INVENTORS
WINSTON ERIC PAYTON JEFFERY
WALTER RUNCIMAN STEPHENS
BY
ATTORNEYS 3,320,986
CHISELS
Winston E. P. Jeffery, Birmingham, and Walter R. Stephens, Lapworth, England, assignors, by mesne assignments, to Thor Hammer Company Limited, a company of Great Britain
Filed Apr. 9, 1965, Ser. No. 446,841
1 Claim. (Cl. 145—61)

This invention relates to chisels which are struck a blow or blows to cause operation and which have an impact end upon which the blows are struck and, opposite to this, a working end which is formed or shaped to perform a cutting, piercing, drifting, punching, splitting, marking, or like operation upon the work. Such chisels are hereinafter referred to as being of the "type specified."

In such chisels as at present made, the portion between the working end and the impact end is generally in the form of a shank (and is hereinafter referred to as the "shank") which is integral with the impact end and may also be integral with the working end although in some cases the working end may be constituted by a specially formed tip or the like.

A chisel has an elongated shank formed integrally with the working end and impact end, the former being relatively hard and the shank and impact end being generally not given any hardening treatment but nevertheless the impact end is still relatively hard and is of a similar degree of hardness as the body of the tool (e.g. a hammer) which is used to deliver the blows to the impact end.

Certain disadvantages and drawbacks arise in practice due to the blow being struck between two members (i.e. impact end of chisel and head of hammer) both of which are relatively hard and it is the broad object of the invention to provide improvements in tools of the type above defined which will eliminate, or substantially reduce, these disadvantages and drawbacks which are mentioned hereinafter.

According to the invention we provide a chisel comprising a shank having an impact end and a working end, the impact end including a head, said head being initially of small cross-section than the end of said shank adjacent said head and has a tapered, conical projection on its underside, said shank having a recess disposed in the end thereof with a communicating tapered conical hole located centrally thereof, said recess and said hole being dimensioned to respectively receive therein said head and said projection, said head being formed of a soft material so as to mushroom out when struck and form a dome-shaped head extending across the whole of said end of the shank.

As applied to a metal the expression "relatively soft" is intended to designate a metal such as "copper," "lead" or "bronze"; however, the material of the head may be non-metallic such as resin, leather, rubber or the like or it may be a synthetic resinous material such as "nylon" and similar plastics materials all of which can be regarded as relatively soft as compared with a metal such as steel.

With chisels as at present made, the shank of the chisel at the impact end is usually tapered off slightly but as the chisel is used, this impact end begins to burr over and may also split at one or more places and when this begins to happen certain disadvantages arise. Thus burring over of the impact end results in the majority of blows being struck at an incorrect angle, so that the impact is to one side of the end and an efficient blow is not obtained and also instead of a full face-to-face contact between the tool and the impact end being obtained, there is generally only a small area of contact and owing to the comparative hardness between the tool and the impact end of the chisel, there is usually a substantial rebound by one or both of these parts.

There is also a very substantial danger which can arise from the burring over and splitting of the impact end due to work hardening and eventual failure of the metal, resulting in chips or small fragments and sparks of metal flying off from the impact end of the chisel and, in the past, this has been the cause of frequent serious accidents.

However, with the use of the present invention, because of the presence of the softer material at the impact end of the chisel, this material is able to yield when struck and a greater proportion of the force of the blow will be transmitted to the chisel with a greater instantaneous area of contact between the tool and the impact end of the chisel. Also, because the softer material will deform without splitting, it considerably reduces the damage to the impact end of the chisel and the tool and as the softer material will not split or fly off in the form of chips, fragments or sparks, it will eliminate or substantially reduce the possibility of injury from this source.

Also the provision of the softer material on the impact end of the chisel will lessen the likelihood of slipping or glancing blows which frequently occur with the present form of chisel and a more effective blow will be obtained.

The invention is illustrated in the accompanying drawings wherein are shown by way of examples several different forms of head which may be applied to cold chisels and in these drawings, FIGURES 1, 2 and 3 are sectional views of the end of a chisel showing the application thereto of a detachable head, and FIGURE 4 is a view showing on the left one form of head immediately after application to the end of a chisel and on the right the form taken by the head after the chisel has been used.

In the form shown in FIGURE 1 the head 10 is of generally cylindrical form and the end of the chisel shank 11 is provided with a cylindrical recess 12 in which there is seated a boss 13 projecting from the end face of the head when the head is applied to the end of the shank. In this case the head may be of beryllium copper or like soft metal and may be brazed or soldered or otherwise permanently united to the end of the shank after being inserted in position. After a good deal of wear the head can be struck off or machined off and a new head applied.

In the form shown in FIGURE 2, the detachable head 14 has a substantially cylindrical shape the axial length thereof being somewhat less than the diameter and one end face of the head is provided with an axially projecting stud 15 which is formed with an external screw thread and the head is secured to the end of the chisel shank 16 by providing an internally threaded axial opening 17 in the end of the shank into which the externally threaded stud 15 can be screwed.

The face of the head from which the screwed stud 15 projects is also provided around the stud with a cylindrical projecting portion forming a projecting annular boss 18, and a counterbore or recess 19 is provided around the end of the opening in the chisel shank so that this boss 18 seats therein and provides a strong connection between the head 14 and the shank which will assist in transmitting the blow from the head 14 to the shank and relieve the threaded stud 15 from having to bear all the stress of the impact.

In this case the head may be formed from a suitable plastics material such as nylon, or from a soft metal such as beryllium copper.

In order to prevent the head from becoming loosened during use, some form of non-positive locking means is preferably provided between the head and the end of the shank and, for example, this may take the form of serrations extending radially outwards on the end face of the counterbore 19 in the shank around the axial opening 17 therein for co-operation with the flat underface of the boss 18 on the head and with this arrangement, when the head has been screwed into position and one or two blows have been struck in use, the softer material of the head will be displaced and forced into engagement with said serrations to provide a non-positive form of lock to prevent accidental rotation of the head when in use.

In the form shown in FIGURE 3, the head may have a peripheral axially extending flange portion 21 which engages over and around the end of the chisel shank so as to form a cap and thus enlarge the effective diameter of the impact end of the chisel. Similarly with this form, serrations or like formations may be provided on the end and/or side faces of the chisel to co-operate with the corresponding surfaces on the head to provide a non-positive form of lock.

In the form shown in FIGURE 4 the head which may be formed from copper or like soft metal has a cylindrical portion 24 and on its underside a projecting tang 25 which is of conical form of wedge form and which is driven into a correspondingly shaped hole in the end of the chisel shank 26. Referring to the right-hand view of FIGURE 4, it will be observed that after the head 24 has been struck a certain number of blows it will have flattened and mushroomed to form the partly domed shape of head indicated at 27.

What we claim then is:

A chisel comprising a shank having an impact end and a working end, the impact end including a head, said head being initially of smaller cross-section than the end of said shank adjacent said head and has a tapered, conical projection on its underside, said shank having a recess disposed in the end thereof with a communicating tapered conical hole located centrally thereof, said recess and said hole being dimensioned to respectively receive therein said head and said projection, said head being formed of a soft metal so as to mushroom out when struck and form a domed-shaped head extending across the whole of said end of the shank.

References Cited by the Examiner

UNITED STATES PATENTS

| 1,166,485 | 1/1916 | Salz. | |
| 1,711,505 | 5/1929 | McCracken | 145—36 |
| 3,019,827 | 2/1962 | Jeffery et al. | |

WILLIAM FELDMAN, *Primary Examiner.*

R. V. PARKER, Jr., *Assistant Examiner.*